United States Patent
Stanfield

(10) Patent No.: US 7,959,495 B2
(45) Date of Patent: Jun. 14, 2011

(54) METHOD AND APPARATUS FOR FINISHING THE SURFACE OF RUBBER COVERED ROLLERS

(75) Inventor: Charles K. Stanfield, Crete, IL (US)

(73) Assignee: B&J Rocket America Inc., Middlebury, IN (US)

( * ) Notice: Subject to any disclaimer, the term of this patent is extended or adjusted under 35 U.S.C. 154(b) by 172 days.

(21) Appl. No.: 12/446,014

(22) PCT Filed: Oct. 18, 2007

(86) PCT No.: PCT/US2007/081728
§ 371 (c)(1),
(2), (4) Date: Apr. 17, 2009

(87) PCT Pub. No.: WO2008/051779
PCT Pub. Date: May 2, 2008

(65) Prior Publication Data
US 2010/0297918 A1 Nov. 25, 2010

(51) Int. Cl.
*B24B 1/00* (2006.01)
(52) U.S. Cl. .......... 451/49; 451/54; 451/57; 451/59; 451/69; 451/70; 451/513; 407/29.1; 407/29.13; 407/29.14
(58) Field of Classification Search .......... 451/28, 451/49, 51, 57, 58, 59, 65, 69, 70, 490, 513, 451/541, 542, 547, 54; 407/29.1, 29.12, 29.13, 29.14
See application file for complete search history.

(56) References Cited

U.S. PATENT DOCUMENTS

| | | | | |
|---|---|---|---|---|
| 2,499,643 A * | 3/1950 | Hays | ............................ | 451/507 |
| 3,145,511 A * | 8/1964 | Bird et al. | ...................... | 451/541 |
| 4,116,256 A * | 9/1978 | Morris et al. | ................... | 157/13 |
| 4,291,445 A * | 9/1981 | Johnson | ..................... | 407/29.12 |
| 5,504,981 A * | 4/1996 | Jensen et al. | ............... | 407/29.13 |
| 6,358,133 B1 * | 3/2002 | Cesena et al. | ................. | 451/450 |
| 6,632,131 B1 * | 10/2003 | Buchholz | ...................... | 451/547 |
| 6,899,493 B1 * | 5/2005 | Russell | .......................... | 407/35 |
| 6,932,680 B1 * | 8/2005 | Collins | .......................... | 451/69 |
| 2002/0123302 A1 * | 9/2002 | Maras et al. | .................. | 451/542 |
| 2002/0168929 A1 * | 11/2002 | Fujioka | .......................... | 451/547 |
| 2005/0064799 A1 * | 3/2005 | Raffaelli | ........................ | 451/42 |
| 2010/0031788 A1 * | 2/2010 | Gudleske | ....................... | 82/1.11 |

* cited by examiner

*Primary Examiner* — Eileen P. Morgan
(74) *Attorney, Agent, or Firm* — Thomas E. Hill; Wildman, Harrold, Allen & Dixon LLP

(57) ABSTRACT

A method and apparatus for finishing the surface of rubber or synthetic covered rollers (10) is disclosed. As seen in FIG. 3, a rotating hub (16) having a circumferential abrasion band (47) and an adjacent set of rasp blades (20) arranged end-to-end and extending circumferentially about the hub is used to progressively and sequentially remove bands of surface material by cutting and then abrading as the hub and roller are rotated and one is moved axially relative to the other.

10 Claims, 4 Drawing Sheets

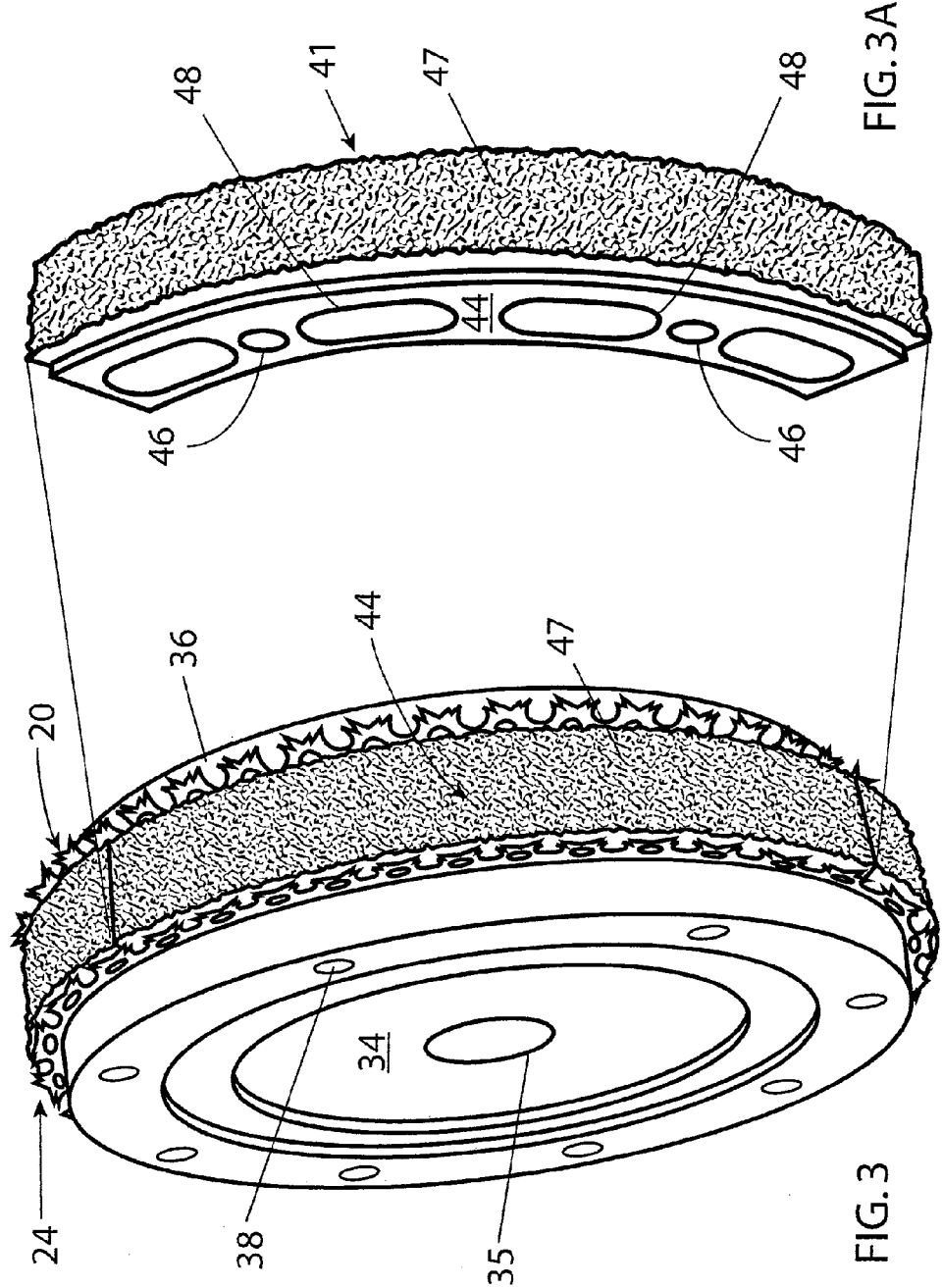

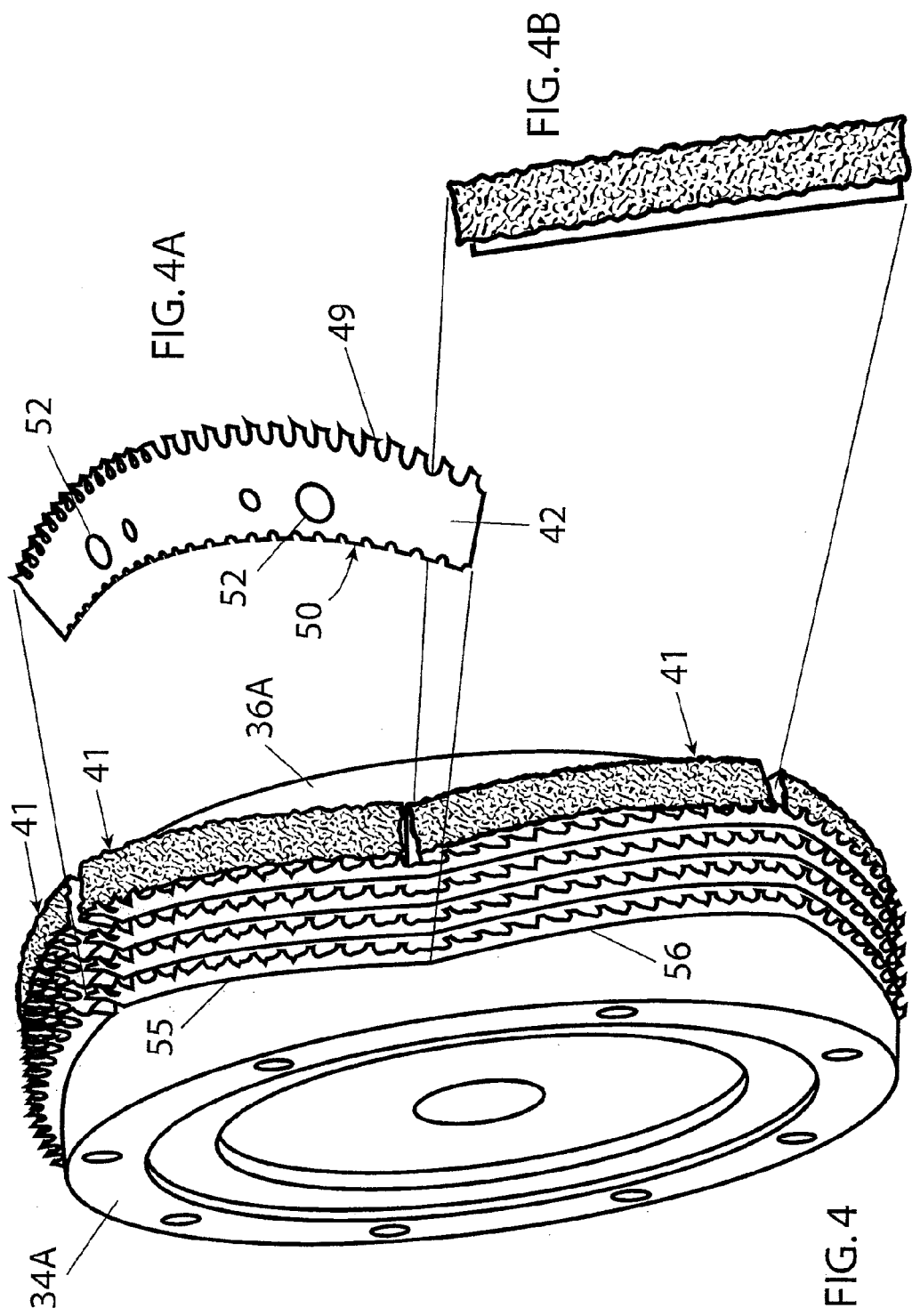

METHOD AND APPARATUS FOR FINISHING THE SURFACE OF RUBBER COVERED ROLLERS

CROSS REFERENCE TO RELATED APPLICATION

Applicant claims priority of U.S. Provisional Application No. 60/852,942 filed on Oct. 19, 2006.

BACKGROUND

Rubber covered rollers or, simply, rollers, of the types used in the printing industry, conveyors, manufacturing processes and the like, are manufactured to meet predetermined tolerances. Typically, a support, outer covering is provided on a metal roller, and a grinding or abrading process is used to form the surface of the roller to the desired tolerance relative to the central axis (normally an axis of rotation) of the roller. The cover may be rubber, polyurethane or other synthetic material. Thus, the terms rubber "or synthetic" are intended to be interchangeable and to include all such materials.

It has been found that although this process, as generally described above, of forming the cylindrical surface of a rubber covered roller has proved satisfactory in obtaining the desired tolerance on the surface of the roller, the process is time-consuming because the abrading process removes only small portions of the rubber surface at a time. Thus, it typically takes a substantial amount of time to form the surface of the rubber coating to the desired tolerance and dimension. In short, the existing process is time consuming and, therefore, expensive, due to the use of gritted surfaces to remove required amount of rubber in the form of small particles, much like dust.

SUMMARY OF THE INVENTION

The present invention provides a driven hub including both cutting and abrading tools on the same rotating work surface. The hub is generally cylindrical and driven in rotation by an electric motor. At least one set of rasp blades is mounted to extend circumferentially about the hub. Individual blades (for example, eight) form a set of blades which extends entirely about the periphery of the hub, in either a straight, or a slanted or staggered formation. Also mounted about the periphery of the hub is a band of abrading material forming a gritted surface. For example, the abrading material of the band may be tungsten carbide grit secured by brazing to the outer curved surface of a set of curved mounting sections, which are mounted about the periphery of the hub to form a circumferential band of abrasion material which removes smaller particles of the rubber surface through friction, leaving a smoother surface on the roller and establishing the desired manufacturing tolerances on the outer cylindrical surface of the roller. Preferably, the circumferential band of abrasive material extends completely about the hub.

The rasp blades bring the outer diameter of the exterior surface of the roller near the desired dimension. Removal of material to the desired finish tolerance is accomplished quickly in comparison with prior abrasion techniques because the cutting edges of rasp blades are capable of removing substantially more material (in larger pieces) per revolution than even rough-grit abrasion surfaces. Then, the rotating, adjacent abrasion band reduces the outer diameter of the roller being formed to the desired diameter as the hub is moved axially, providing the desired control over the final dimension of the diameter, and resulting in a smooth outer surface of cylindrical shape for the rubber covered roll, while reducing the overall manufacturing time.

In operation, the hub is driven in rotation and the roller to be processed, having a rubber outer surface and an axis extending parallel to the axis of rotation of the hub is rotated about its axis. The hub is driven about its axis (at a higher angular rotation than the roller) and simultaneously moved axially relatively to the roller. As the two surfaces engage, the rasp blades on the hub cut and quickly remove a relatively larger amount of surface material from the roller per revolution. This is followed (axially of the roller being finished) by the abrading/grinding surface of the abrasion band which removes less material per revolution than the blades, in smaller, powder-like particles, but with greater precision, thus providing an efficient method of simultaneously forming a finished cylindrical rubber surface on the roller within desired tolerances in a shorter time than previous techniques using abrading alone.

In an alternate embodiment, a circumferential set of rasp blades is placed on both sides of the abrasion band so that the hub may remove material in the same manner as the roller is reciprocated in both axial directions.

BRIEF DESCRIPTION OF THE DRAWING

FIG. 3 is a perspective view of a first embodiment of the hub of the present invention;

FIG. 3A is a perspective view of an individual section of the abrasion band of the hub of FIG. 3;

FIG. 4 is a perspective view of a second embodiment of the present invention with the blades and abrasion sections arranged in staggered arrays conforming to one another;

FIG. 4A is a side elevation view of an individual rasp blade of the embodiment of FIG. 4; and FIG. 4B is an elevational view of a peripheral section of the abrasion band, looking toward the axis of rotation of the hub.

DETAILED DESCRIPTION OF THE ILLUSTRATED EMBODIMENT

Figure 1:
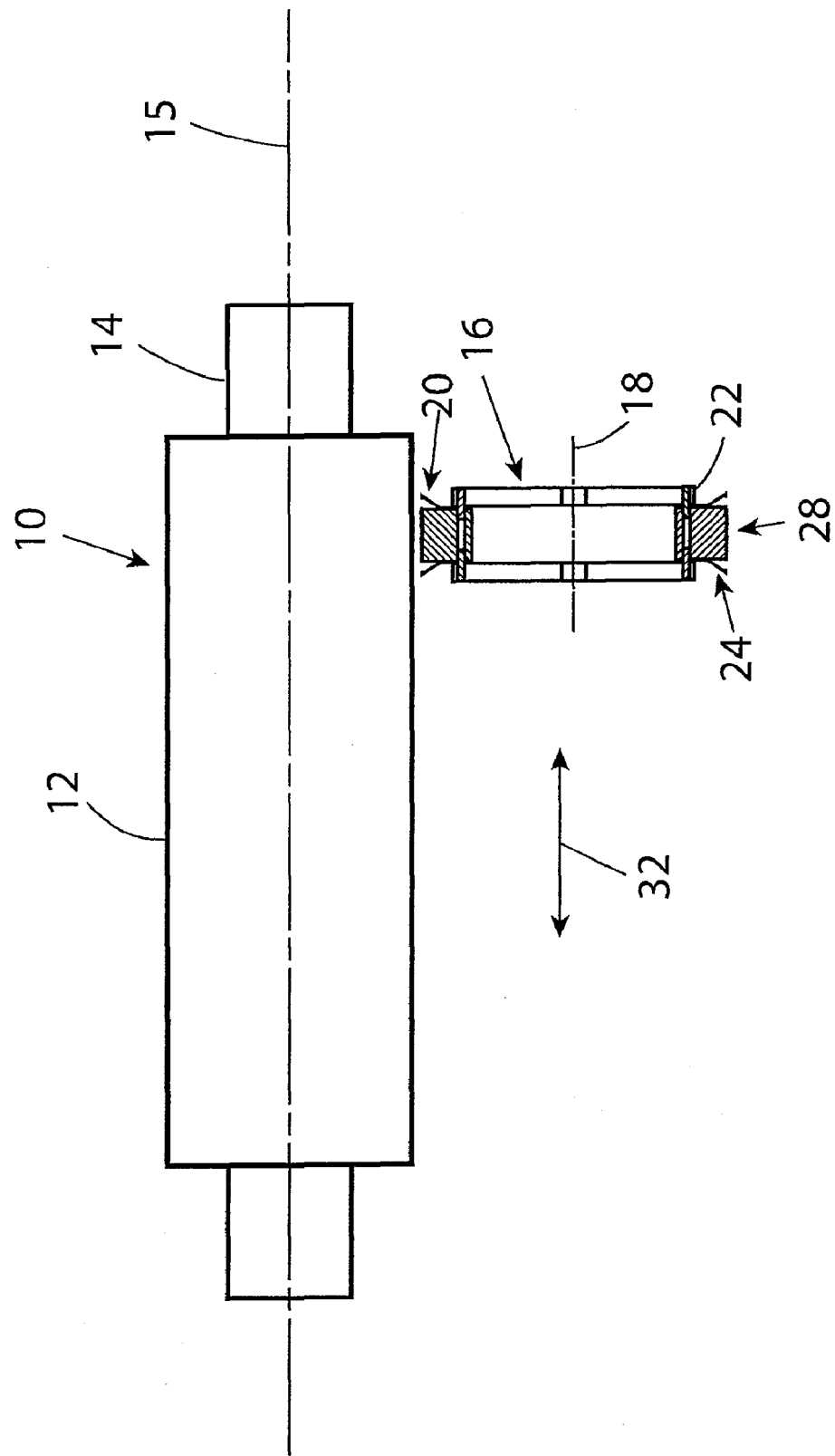
FIG. 1 is an elevational top view of a rubber roller and a hub of the present invention in relative position for finishing the surface of the roller, with the hub shown in cross section.

Referring first to FIG. 1, reference numeral 10 generally designates a roller including a rubber (or synthetic) outer cylindrical surface or cover 12 adapted to engage, for example, a conveyor belt or to act as a pinch roller with another roller performing a nip to feed sheet materials, or the like, or to support and guide a paper web in a label machine. The roller 10 may include a metal support shaft 14 for supporting and/or driving the roller, or otherwise mounting it for support and rotation. The roller as described, is of the type used widely in industry provided with an outer layer (typically rubber or other synthetic material) for engaging sheets, supporting webs, driving, moving materials, processing paper forms, labels, and for many other purposes.

Located beneath the roller 10 is a rotary hub generally designated 16. The hub 16 is mounted on a shaft (not seen in the drawing) and rotatable about an axis 18 which is parallel to the axis 15 on which the roller 10 rotates. The hub 16 is driven in rotation by a motor, typically an electric motor, as further described within.

In order to obtain an understanding of the nature of the invention, its overall operation and the significant operating components will be described briefly. The hub 16 includes a first set of rasp blades (typically, all individual blades are the same) generally designated 20 which are arranged end-to-end and extend circumferentially about an outer cylindrical surface 22 of the hub 16. A second set of similar rasp blades generally designated 24 is located circumferentially about the hub 16 on the opposing side of a circumferential band of abrasion material 28.

Rasp blades of the type used herein are generally known in the tire retreading industry; and all the rasp blades may be the same design. In the embodiment of FIGS. 1 and 3, the rasp blades each include a base or mounting plate (to be further described below, but seen at 42 in FIG. 4A), which may be located generally (but not necessarily) in a plane extending perpendicular to the axis of rotation of the hub. Between the two sets of rasp blades 20, 24, there is a central section, generally designated 28 composed of a plurality of curved abrasion sections mounted end-to-end to form the peripheral abrasion band extending about the periphery of the hub and located between the two side sets of rasp blades 20, 24.

In operation, the roller 10 is preferably mounted so that it may be driven in rotation, but it is not moved axially (although this is not necessarily the case, as persons skilled in the art will understand). The hub 16 which is also mounted for rotation about an axis parallel to the axis of the roller, and driven, as disclosed above. The hub 16 is moved in an axial direction (by machine or by hand), with the axis of rotation 18 of the hub 16 remaining parallel with the axis of rotation 15 of the roller 10. This axial motion is illustrated diagrammatically by the arrow 32 in FIG. 1. The hub 16 may be moved in reciprocal axial motion—that is, back and forth laterally as shown in FIG. 1 after each pass, the hub may be moved closer to the roller until the desired amount of surface material is removed from the rubber layer 12 and desired tolerances and dimensions of the outer surface of the roller 10 are achieved. The smoothness of the resulting surface is determined largely by the size of the grit selected to make the abrasion sectors. If desired, two or more bands of grit of different size may be used. In this case, each abrasion band extends circumferentially about the hub.

Machinery for manufacturing rubber rollers may be more elaborate than that described, for example, it may employ measuring apparatus for determining dimensions of the finished roller and assuring desired dimensions and tolerances are met, but such does not alter this invention.

Figure 2:
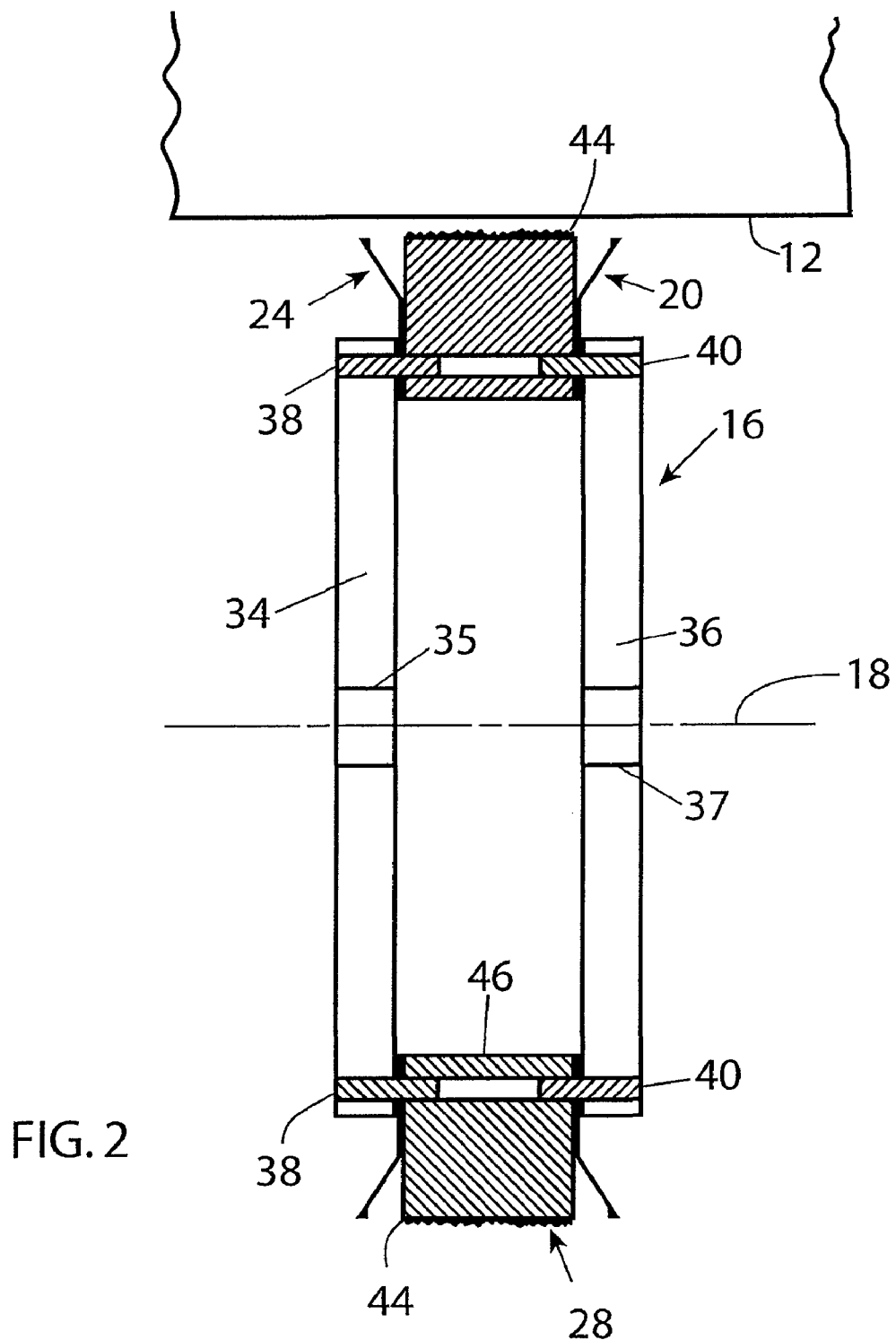
FIG. 2 is a close-up view of the structure of FIG. 1, with the roller shown in fragmentary form, and the hub again shown in cross section.

Turning now to the hub 16, it will now be described in further detail. Referring to FIG. 2, similar reference numerals are used to refer to like parts seen in FIG. 1.

The hub 16 includes first and second side plates 34, 36, each of which may be in the form of a disc, and which include central openings 35, 37 respectively, in coaxial alignment for receiving a drive shaft (not seen in the drawing). Each of the side plates 34, 36 is provided with a series of pins which are press fit into the side plate and extend toward the center of the hub. The pins for the plate 34 are seen in FIG. 2 and designated 38; and the corresponding pins for the right side plate 36 are designated 40. The central abrasion band 28 is formed of a plurality of curved individual sectors or sections 41 (see FIG. 3A)—for example, eight individual sectors may extend about the periphery of the hub, just as it is, for purposes of description, possible to have eight individual blades extending about the periphery of the hub to form a complete cutting blade (left or right side).

Referring to FIGS. 2, 3 and 3A, the individual sectors of the abrasion band each include a metal support mount, such as the one designated 44 in FIGS. 2 and 3A. Each of the curved metal support mounts 44 includes mounting openings 46 for receiving in sliding relation, opposing mounting pins 38, 40 (FIG. 2) to mount and retain the sets of blades 20, 24 and the individual support mounts 44 are placed end-to-end to form the circumferential abrasion band 28. The support mounts are then secured to the opposing side plates 34, 36 to form a rigid hub. The pins fixed to the side plates 34, 36 are slidably received in apertures 46 in the central curved support mounts 44 of the abrasion section of the hub so that the hub may be disassembled, if desired to replace the blades, for example.

The side plates 34, 36 are secured together when the drive shaft is placed through the apertures 35, 37. The drive shaft has one end with a fitting to engage the outer surface of one of the hub plates 34, 36. The shaft extends through the opposing hub side plate, and then a nut is turned onto the portion of the drive shaft extending through the opposing hub plate to form a rigid hub. The end of the drive shaft not having the threads to receive the mounting nut is coupled to the driver motor. Other arrangements are possible.

Turning now to FIGS. 3 and 3A, there is shown a first embodiment of the hub shown in FIG. 2 and described above. Specifically, one curved support mount 44 of the abrasion band is shown individually in FIG. 3A, with circular mounting holes 46 to receive the opposing pins 38, 40 of the side plates, and with spaced, elongated openings 48 to reduce weight and conserve material. The outer surface of each individual abrasion sector is covered with abrasive material 47. In the preferred embodiment, the abrasive material 47 is in the form of tungsten carbide grit brazed to an underlying surface. Such grit is commercially available in various sizes for desired smoothness of the surface being worked. Other abrasion materials may also be employed. Persons skilled in the art will appreciate that the smaller the abrasion particles or grit, the smoother will be finished surface. However, smaller grit removes less material per pass, thus extending the time necessary to achieve the desired tolerance.

Referring now to FIG. 1, and mindful that the hub 16 is moved from side-to-side, parallel to the axis 18 of the roller 12 for finishing, the distance from the axis 18 of the roller to the cutting edges of the blades of the left and right side sets of blades 20, 24 is less than the distance from the axis 18 to the effective cutting surface of the band of abrasive material 28 (sometimes referred to as the abrasion band). It is appreciated that the surface of the abrasion band is not uniform, and this dimensional difference depends on the grit size used. However, persons skilled in the art can determine this distance. Obviously, as the roll is translated axially, the blades on the side opposite the direction of movement of the roller, removes material from the periphery of the rubber surface 12 first, and then that section of roller is engaged by the abrasion band 28. For improved results, it has been found that the differences between the effective radius of the grit band and the radius of an associated blade cutting edge is in the range of 0.30-0.40 in. for improved results and reduced overall processing time.

It will be appreciated that both the blades and the surface of the abrasion or grit band rotate at the same speed. With the difference in cutting radius disclosed above, overall processing time has been found to be improved for a wide range of desired tolerances on the finished surface.

Turning now to the left side set of rasp blades, the illustrated blades are of a type shown in FIG. 4A and generally designated 50. These blades have been used in tire retreading machines for removing surface material through a cutting action in order to prepare a used tire to receive a new tread. One such blade is disclosed in Stanfield U.S. Pat. No. 6,789, 982, the disclosure of which is incorporated herein by reference.

As is disclosed in the Stanfield '982 patent, each blade is stamped from sheet metal and then further formed. Thus, each blade includes a flat metal base portion in the form of a curved portion of a plate, sometimes referred to as the base or mounting plate, and designated 42 in FIG. 4A and a plurality of spaced peripheral teeth. Each tooth may include two cutting points, facing in opposing directions, and offset in opposing lateral directions relative to the base plate 42. Adjacent teeth are separated by a curved, central opening as may be seen in FIG. 4A, at 49. The cutting edge of each cutting point faces in an opposing directions, as mentioned, and includes a rear surface (the two rear surfaces thus opposing one another) which act as buffing surfaces. Thus, each blade may be rotated in either direction along the length of the blade and still perform, and then turned around for extending the use time. Each cutting point will thus include a cutting edge and a buffing surface of the companion or next adjacent cutting point facing the opposite direction. As seen in FIG. 4A, the blade 50 includes a pair of apertures 52 for mounting. The apertures 52 are received on the pins 38 of the 34A, 36A of FIG. 4 which form the side plates of the hub and on which the blades as well as the abrasion sectors are mounted.

In the embodiment of FIG. 3, the cutting points of the blade are slightly different. Each tooth has four cutting edges, two facing in each of the two opposing directions. Each pair of cutting edges on one side of a tooth are offset laterally out of the plane of the base plate 42 to a respective side in opposing directions, so that each cutting point of a tooth, rotating in a given direction, will have two cutting edges, one on either side of the base plate 42, and two complimentary buffing edges from the cutting points facing in the opposing rotational direction. But the blade is reversible, also.

In the embodiment of FIG. 4, on the other hand, each tooth has two cutting edges and two buffing edges, one of each being operative for each direction of rotation of the blade. Also, in FIG. 4, the abrasion sectors and multiple sets of rasp blades are formed into a staggered array or chevron pattern, as determined by the inner support surfaces of the side plates 34A, 36A. See, for example, surfaces 55, 56.

Having thus disclosed in detail a number of embodiments of the invention, persons skilled in the art will be able to modify certain of the structure which has been disclosed and to substitute elements for those illustrated while continuing to practice the principle of the invention and it is, therefore, intended that all such modifications and substitutions be covered as they are embraced within the spirit and scope of the appended claims.

The invention claimed is:

1. A hub for use in finishing the surface of a roller having a cover comprising:
    a band of gritted surface material extending circumferentially about an axis of revolution of said hub;
    a first set of rasp blades arranged end-to-end and extending in a continuous non-interrupted manner circumferentially about said axis of revolution, and located adjacent a first side of said band of gritted material, each rasp blade having a plurality of cutting edges; and
    a second set of rasp blades arranged end-to-end and extending in a continuous non-interrupted manner circumferentially about said axis of revolution, each rasp blade of said second set having a plurality of cutting edges, said second set of rasp blades located adjacent a second opposing side of said band of gritted material,
    whereby when said roller and hub are rotated and one of said roller and hub is displaced axially of the other, the first or second set of rasp blades cut and remove surface material of said roller, and said gritted surface thereafter removes material from the surface of said roller in abrading action, and wherein the cutting edges of said first and second sets of rasp blades define a respective generally circular path having a first radius and the surface of said band of gritted material defines an effective cylindrical finishing surface having a second radius, and wherein said second radius is greater than said first radius, and whereby the relative motion of said hub axially of said roller may be in either opposing direction to finish the surface of said cover of said roller.

2. The hub of claim 1 wherein the second radius exceeds said first radius by approximately 0.30 to 0.40 inches.

3. The hub of claim 1 wherein each of said rasp blades comprises a plurality of cutting points, each including at least first and second cutting edges facing in opposing directions and a buffer surface for each cutting edge and facing an opposing direction.

4. The hub of claim 1 wherein said band of gritted material comprises a plurality of sectors arranged end to end and extending circumferentially about said hub, each sector including a rigid support mount and an outer surface comprising tungsten carbide grit.

5. The hub of claim 4 further comprising first and second disk-shaped side plates securing said plurality of sectors of gritted material and said sets of rasp blades in a rigid hub.

6. The hub of claim 1 wherein said band of gritted material comprises a plurality of sectors, each including a mounting base and an exterior surface of tungsten carbide grit, and wherein said sectors are arranged in a chevron pattern about the circumference of said hub.

7. The hub of claim 6 wherein said blades are arranged in a chevron pattern, each blade aligned with an associated sector.

8. The hub of claim 5 further comprising third and fourth sets of a plurality of rasp blades arranged parallel to associated blades of said first set of blades.

9. A method of finishing the surface of a roller having a rubber or synthetic cover comprising:
    rotating the roller about its axis;
    engaging the outer surface of the cover of the roller with a hub rotating about its own axis which is parallel to the axis of the roller, wherein the hub includes a circumferential band of abrading material having first and second opposed ends and first and second sets of rasp blades extending end-to-end in a continuous non-interrupted manner circumferentially about said hub adjacent said band and disposed adjacent said first and second opposed ends, respectively; and
    translating one of said hub and roller longitudinally of its axis to remove a first circumferential band of said surface material from said roller by cutting action of said rasp blades, and immediately thereafter removing a second circumferential band of material from said roller, wherein the cutting edges of said rasp blades are arranged at a first radius relative to an axis of revolution of said hub, and said band of abrading material defines a second radius of effective abrading relative to said axis of revolution of said hub, and wherein said second radius is greater said first radius.

10. The method of claim 9 wherein the cutting edges of said rasp blades are arranged at a first radius relative to an axis of revolution of said hub, and said band of abrading material defines a second radius of effective abrading relative to said axis of revolution of said hub, and wherein said second radius is greater than said first radius by an amount approximately 0.30-0.40 in.

* * * * *